US012801184B2

(12) United States Patent
Zhang

(10) Patent No.: US 12,801,184 B2
(45) Date of Patent: Nov. 17, 2026

(54) ACCESSORY DEVICE AND ELECTRONIC SYSTEM

(71) Applicant: Lenovo (Beijing) Limited, Beijing (CN)

(72) Inventor: Yi Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 239 days.

(21) Appl. No.: 18/525,087

(22) Filed: Nov. 30, 2023

(65) Prior Publication Data

US 2024/0219972 A1 Jul. 4, 2024

(30) Foreign Application Priority Data

Dec. 30, 2022 (CN) ......................... 202211728259.9

(51) Int. Cl.
*G06F 1/16* (2006.01)
*G03B 17/02* (2021.01)

(52) U.S. Cl.
CPC ........... *G06F 1/1675* (2013.01); *G03B 17/02* (2013.01)

(58) Field of Classification Search
CPC .............. B32B 13/14; B32B 2037/243; B32B 2262/101; B32B 2264/102; B32B 2307/4023; B32B 29/02; H04N 7/142; A61M 2005/31516; A61M 2205/273; A61M 5/31501; A61M 5/321; A61M 5/50; G03B 17/02; G06F 1/1675
See application file for complete search history.

(56) References Cited

U.S. PATENT DOCUMENTS

| | | | | |
|---|---|---|---|---|
| 8,432,485 B1 * | 4/2013 | Martinez | H04N 23/57 | 348/207.1 |
| 11,379,015 B2 * | 7/2022 | Lin | G06F 1/1677 | |
| 12,250,455 B2 * | 3/2025 | Ou | H04N 23/58 | |
| 12,423,045 B2 * | 9/2025 | Chen | F16M 11/24 | |
| 12,513,377 B2 * | 12/2025 | Lv | H04N 23/51 | |
| 12,578,066 B2 * | 3/2026 | Bertken | F21L 4/027 | |
| 2007/0010286 A1 * | 1/2007 | Luke | H04M 1/0208 | 455/556.1 |
| 2012/0001999 A1 * | 1/2012 | Schirdewahn | H04N 7/142 | 348/E7.083 |
| 2012/0106940 A1 * | 5/2012 | Kaneda | G03B 15/05 | 396/177 |
| 2012/0256929 A1 * | 10/2012 | Koenig | G09G 5/00 | 345/503 |
| 2015/0002688 A1 * | 1/2015 | Baldwin | H04N 23/69 | 348/211.9 |

(Continued)

*Primary Examiner* — Antoinette T Spinks
(74) *Attorney, Agent, or Firm* — ANOVA LAW GROUP, PLLC

(57) ABSTRACT

An accessory device includes a first body, a first connection assembly, and a second body. The first body includes a first functional assembly. The first connection assembly is connected to the first body. The second body is connected to the first connection assembly and includes a first communication assembly configured to be electrically connected to an electronic device. The first functional assembly has a functional orientation. A position relationship between the first body and the second body is changed according to the first connection assembly to change the functional orientation of the first functional assembly.

14 Claims, 13 Drawing Sheets

(56) References Cited

U.S. PATENT DOCUMENTS

| | | | | |
|---|---|---|---|---|
| 2015/0334258 | A1* | 11/2015 | O'Neill | H04N 1/00307 348/207.1 |
| 2016/0330356 | A1* | 11/2016 | Saito | G03B 15/05 |
| 2017/0115549 | A1* | 4/2017 | Wada | G03B 17/561 |
| 2020/0296192 | A1* | 9/2020 | Zhang | G09G 3/344 |
| 2021/0191476 | A1* | 6/2021 | Lin | H05K 5/03 |
| 2022/0091640 | A1* | 3/2022 | Vassberg | A45C 11/00 |
| 2022/0113170 | A1* | 4/2022 | Cheng | G06F 1/1607 |
| 2023/0345120 | A1* | 10/2023 | Ou | H04N 23/58 |
| 2025/0138580 | A1* | 5/2025 | Liao | G06F 1/1662 |
| 2026/0076001 | A1* | 3/2026 | Han | H10H 29/03 |

* cited by examiner

ACCESSORY DEVICE AND ELECTRONIC SYSTEM

CROSS-REFERENCE TO RELATED APPLICATION

The present disclosure claims priority to Chinese Patent Application No. 202211728259.9, filed on Dec. 30, 2022, the entire content of which is incorporated herein by reference.

TECHNICAL FIELD

The present disclosure relates to the electronic technology field and, more particularly, to an accessory device and an electronic system.

BACKGROUND

Many accessory devices that are used with an electronic device include functional assemblies. A functional assembly is often used with a fixed angle with an unchanged functional orientation.

Thus, the functional assembly can only be used in a fixed scene and cannot be used in a plurality of scenes with changing functional orientations.

SUMMARY

A first aspect of the present invention provides an accessory device, including a first body, a first connection assembly, and a second body. The first body includes a first functional assembly. The first connection assembly is connected to the first body. The second body is connected to the first connection assembly and includes a first communication assembly configured to be electrically connected to an electronic device. The first functional assembly has a functional orientation. A position relationship between the first body and the second body is changed according to the first connection assembly to change the functional orientation of the first functional assembly.

A second aspect of the present disclosure provides an electronic system, including an accessory device and an electronic device. The accessory device includes a first functional assembly. The first connection assembly is connected to the first body. The second body is connected to the first connection assembly and includes a first communication assembly configured to be electrically connected to an electronic device. The first functional assembly has a functional orientation. A position relationship between the first body and the second body is changed according to the first connection assembly to change the functional orientation of the first functional assembly. The electronic device includes a third body, a third connection assembly, and a fourth body. The third body in a plate shape includes a first side surface and a second side surface. A display assembly having a display function is arranged on the second side surface. The third connection assembly is connected to the third body. The fourth body is connected to the third connection assembly and includes a third side surface and a fourth side surface that are opposite to each other. An input assembly having an input function is arranged at the third side surface. A second communication assembly is arranged at the first side surface and configured to be electrically connected to the first communication assembly.

DETAILED DESCRIPTION OF THE EMBODIMENTS

The technical solution of the present disclosure is described in detail below in connection with the accompanying drawings and embodiments of the present disclosure.

Figure 1:
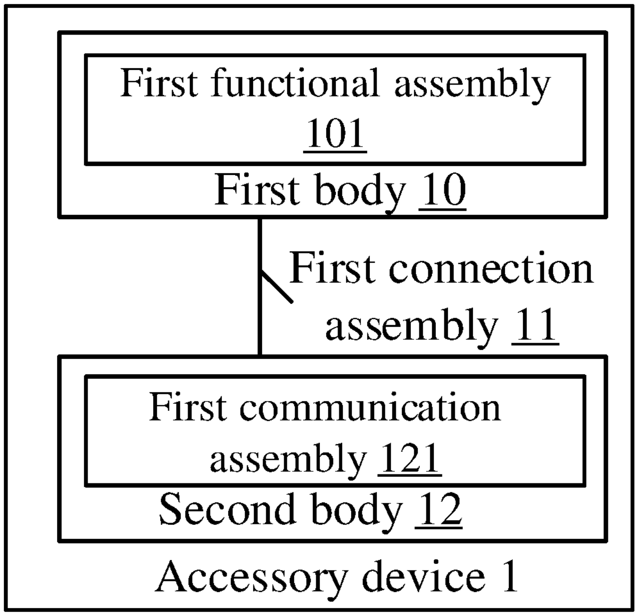
FIG. 1 illustrates a schematic structural diagram of an accessory device according to some embodiments of the present disclosure.

FIG. 1 illustrates a schematic structural diagram of an accessory device 1 according to some embodiments of the present disclosure. As shown in FIG. 1, the accessory device 1 includes a first body 10, a first connection assembly 11, and a second body 12.

The first body 10 includes a first functional assembly 101.

The first connection assembly 11 is connected to the first body 10.

The second body 12 is connected to the first connection assembly 11 and includes a first communication assembly 121. The first communication assembly 121 can be configured to be electrically connected to the electronic device.

The first functional assembly 101 can have a functional orientation. The first body 10 can change the position relationship with the second body 12 according to the first connection assembly 11 to change the functional orientation of the first functional assembly 101.

In some embodiments, the functional orientation of the first functional assembly can be an orientation of the first functional assembly. The function of the first functional assembly can be related to the orientation of the first functional assembly. When the first functional assembly faces a different direction, the first functional assembly can have a different function. The first position relationship can be determined according to the angle between the first body and the second body. The first communication assembly can be electrically connected to the second communication assembly of the electronic device. The first communication assembly and the second communication assembly can be configured to realize data transmission between the accessory device and the electronic device or enable the electronic device to provide power to the accessory device.

In some embodiments, by changing the position relationship between the first body and the second body, the functional orientation of the first functional assembly can be changed. Thus, the first functional assembly can have a different function when facing a different direction. The first functional assembly is not limited to a fixed scene and can be applied in a plurality of scenes by changing the orientation to improve the varsity of the application of the first functional assembly.

Figure 2:
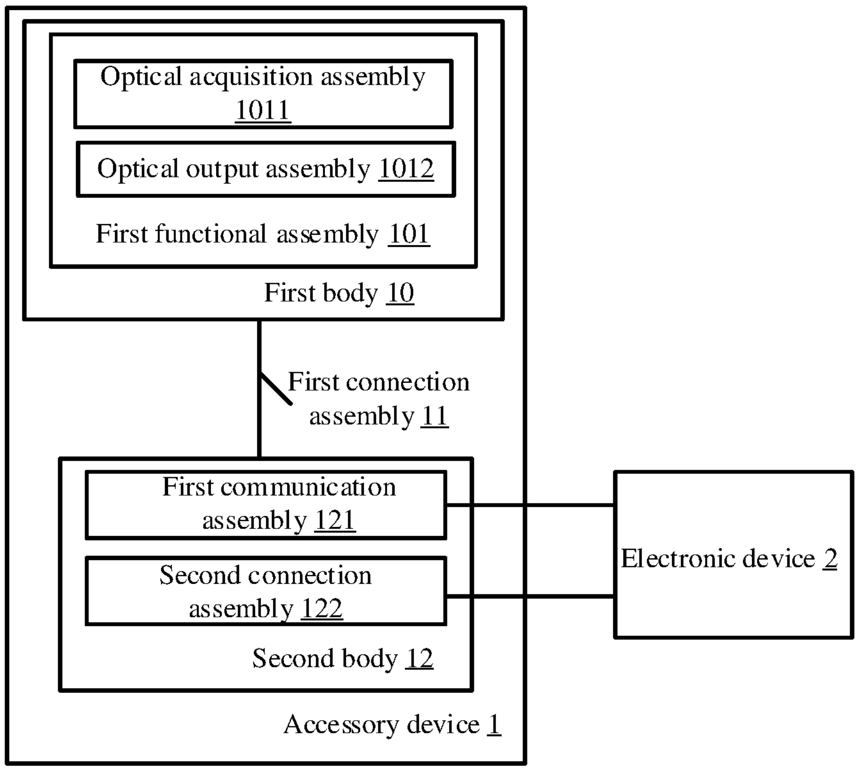
FIG. 2 illustrates a schematic structural diagram of another accessory device according to some embodiments of the present disclosure.

In some embodiments, as shown in FIG. 2, the first connection assembly 11 is a rotatable connection assembly. The first functional assembly 101 can be an optical functional assembly, including an optical acquisition assembly 1011 having an acquisition orientation.

The rotatable connection assembly can be an assembly to allow the first body to flip and rotate at multiple angles relative to the second body, such as a hinge joint, a ball joint, etc. The first connection assembly 11 can also be a mobile connection assembly, such as a sliding connection assembly, a rolling connection assembly, etc. The first functional assembly can also be an audio assembly, a display assembly, a storage assembly, etc.

The optical acquisition assembly can be a camera, a scanner, or another assembly having an imaging function. The camera can be a monocular camera or a binocular camera according to a number of cameras used. The camera can be a long-focus camera or a short-focus camera according to the focus length of the camera. The camera can be a visible light camera, a depth camera, an infrared camera, etc., according to the camera type. The acquisition orientation of the optical acquisition assembly can be in a plurality of different directions. When image collection needs to be performed on objects in different directions, the optical acquisition assembly can be used by changing the acquisition orientation. In some embodiments, the optical acquisition assembly may not be limited to the fixed scene for use and can be used in a plurality of scenes by changing the orientation.

In some embodiments, the optical functional assembly also includes an optical output assembly 1012 with an output orientation.

The optical output assembly can be a light-emitting assembly for illumination or other purposes. The output orientation of the optical output assembly can be in a plurality of different directions. When different applications need to be realized, the optical output assembly can be used by changing the output orientation to have different functions, e.g., an illumination function and a light fill function.

In some embodiments, the optical output assembly is not limited to a fixed scene and can be used in a plurality of scenes by changing the orientation.

In some embodiments, as shown in FIG. 2, the second body 12 includes a second connection assembly 122 that is detachably connected to the electronic device 2.

The second connection assembly 122 can maintain the position relationship between the accessory device 1 and the electronic device 2 after being connected to the electronic device 2. The first communication assembly 121 can be electrically connected to the electronic device 2.

The electronic device can include a fourth connection assembly. The second connection assembly can be detachably connected to the fourth connection assembly. The second connection assembly and the fourth connection assembly can be two magnet connectors. The second connection assembly and the fourth connection assembly can be magnetically connected through the magnet connectors to maintain the position relationship between the accessory device and the electronic device. In some other embodiments, the second connection assembly and the fourth connection assembly can be elastic connectors and bolt connectors. The second connection assembly and the fourth connection assembly can be connected through the elastic connectors or the bolt connectors to maintain the position relationship between the accessory device and the electronic device.

In some embodiments, the accessory device and the electronic device can be detachably connected through the second connection assembly. The second connection assembly can maintain the position relationship between the accessory device and the electronic device. Thus, the flexible connection between the accessory device and the electronic device can be realized, and the position relationship between the accessory device and the electronic device can be maintained to improve the independence and stability of the accessory device.

Figure 3:
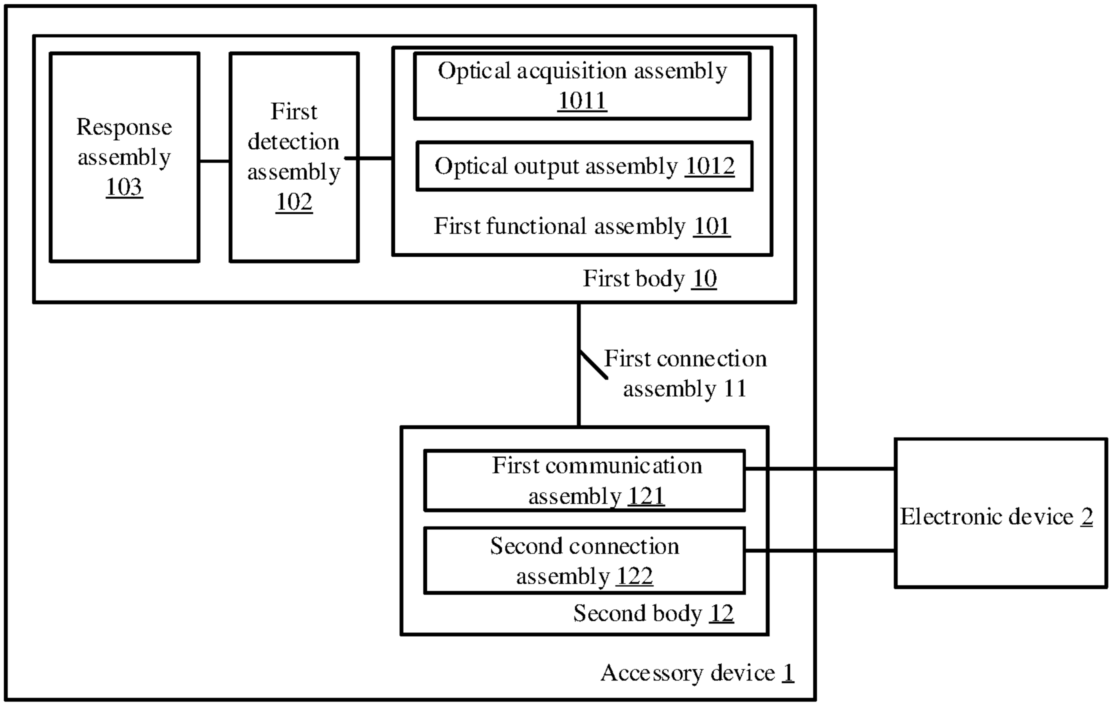
FIG. 3 illustrates a schematic structural diagram of another accessory device according to some embodiments of the present disclosure.

In some embodiments, as shown in FIG. 3, the accessory device 1 further includes a first detection assembly 102 and a response assembly 103.

The first detection assembly 102 can be configured to obtain a detection result representing the function mode of the first functional assembly.

The response assembly 103 can be configured to respond to the detection result to adjust a functional parameter of the first functional assembly.

The first functional assembly can include a plurality of functional orientations. Each functional orientation of the plurality of functional orientations can correspond to a function mode. Functional parameters corresponding to different function modes can be different. Different function modes can be used to implement different applications. Thus, according to the detection result of the function mode, the functional parameter of the first functional assembly can be adjusted to realize a corresponding application.

In some embodiments, by detecting the function mode of the first detection assembly, the functional parameter of the first functional assembly can be adjusted based on the detection result. Thus, the functional parameter can be adaptively adjusted based on the function mode to satisfy the requirements of different scenes and improve the varsity and flexibility of the application scenes of the first functional assembly.

In some embodiments, the first detection assembly can be configured to obtain a first trigger operation. The function mode of the first function assembly can be determined based on the first trigger operation.

The function mode can be selected manually by a user. The electronic device can include a plurality of control members. Each control member of the plurality of control members can correspond to a function mode. The first trigger operation can be a trigger operation performed by the user on any control member to trigger the function mode corresponding to the control member.

The accessory device can also include a toggle switch. When the toggle switch is at different positions, the function mode can be different function mode. The first trigger operation can be a toggle operation performed by the user on the toggle switch to trigger the function mode corresponding to the position of the toggle switch.

The accessory device can further include a plurality of buttons. Each button of the plurality of buttons can correspond to a function mode. The first trigger operation can be a trigger operation performed by the user on any button to trigger the function mode corresponding to the button.

The accessory device can further include a button for switching function modes. Different types of trigger operations can correspond to different function modes. For example, one click can correspond to a function mode, two clicks can correspond to another function mode, and a long press can correspond to yet another function mode. The first trigger operation can be a certain type of trigger operation on the button for switching the function modes to trigger the function mode corresponding to the trigger operation of the type.

In some embodiments, the user can manually select the function mode. The user can select the function mode by triggering the control member of the electronic device, by switching the toggle switch of the accessory device, or by triggering the button of the accessory device to improve the varsity of manually selecting the function mode.

In some embodiments, the first detection assembly can be configured to detect the functional orientation of the first functional assembly and determine the function mode of the first functional assembly based on the functional orientation.

In some embodiments, the first detection assembly of the accessory device can automatically detect the functional orientation of the first functional assembly to determine the corresponding function mode according to the functional orientation. For example, when the detected functional orientation of the first functional assembly is a first direction, the function mode can be determined to be a first mode. When the detected functional orientation of the first functional assembly is a second direction, the function mode can be determined to be a second mode.

In some embodiments, the first detection assembly of the accessory device can automatically detect the functional orientation and determine the corresponding function mode according to the functional orientation.

In some embodiments, a magnet can be arranged in the first body or the second body. A Hall sensor can be arranged at a corresponding part in the other body. When an angle between the first body and the second body changes, the magnet can be away from or close to the Hall sensor to change a magnetic field near the Hall sensor. Thus, the angle between the first body and the second body can be measured through the change in the magnetic field near the Hall sensor to determine the position relationship between the first body and the second body.

In some embodiments, an acceleration generated due to gravity can be measured through a gravity sensor of the first body. An inclined angle of the first body relative to the horizontal plane can be calculated through the acceleration to further determine the angle between the first body and the second body to determine the position relationship between the first body and the second body.

The first detection assembly can detect the functional orientation of the first functional assembly based on the position relationship.

In some embodiments, the position relationship between the first body and the second body can be determined through the Hall sensor or the gravity sensor. The functional orientation of the first functional assembly can be detected according to the position relationship between the first body and the second body to determine the functional orientation of the first functional assembly efficiently and accurately.

In some embodiments, the user can further rotate the first body directly in a certain direction to change the position relationship between the first body and the second body.

In some embodiments, the user can manually rotate the first body to change the position relationship between the first body and the second body.

In some embodiments, the response assembly can be configured to adjust the functional parameter of the first functional assembly based on the detection result. Processing can be performed according to the adjusted functional parameter, and the processing result can be transmitted to the electronic device.

In some embodiments, the response assembly can autonomously adjust the functional parameter of the first functional assembly based on the detection result. Processing can be performed according to the adjusted functional parameter. The processing result can be transmitted to the electronic device. Thus, the accessory device can include an independent processor with strong processing capability, which can save the processing resources of the electronic device.

In some embodiments, the response assembly can be configured to transmit the detection result to the electronic device. Thus, the electronic device can adjust the functional parameter of the first functional assembly based on the detection result. Then, processing can be performed according to the adjusted functional parameter.

In some embodiments, the response assembly can directly transmit the detection result to the electronic device. The electronic device can be configured to adjust the functional parameter of the first functional assembly based on the detection result. Then, processing can be performed according to the adjusted functional parameter. Thus, the accessory device may not need to be integrated with a processor with strong processing capability. Processing can be performed by the electronic device to reduce the manufacturing cost of the accessory device.

In some embodiments, the first functional assembly can be the optical acquisition assembly. The function mode can include the first mode and the second mode.

The first detection assembly can be configured to determine that the acquisition orientation of the optical acquisition assembly in the first mode is the first direction and the acquisition orientation in the second mode is the second direction. In the image collected in the first mode, the third direction can be the positive direction. In the image collected in the second mode, the fourth direction can be the positive direction.

The first direction can be opposite to the second direction. For example, the first direction can face south, and the second direction can face north. The first direction can be opposite to the second direction in a certain degree. For example, the first direction can face southwest, and the second direction can face northwest. In some embodiments, the third direction and the fourth direction can be opposite in perpendicular reference. In some other embodiments, the third direction and the fourth direction can be opposite in horizontal reference and perpendicular reference.

The response assembly can be a chip of the accessory device, e.g., a system on chip (SoC) or a microcontroller unit (MCU). Adjusting the functional parameter of the optical acquisition assembly can include adjusting the direction in which the optical acquisition assembly collects the image. The response assembly can directly use the image collected in the first mode. The response assembly can use the image collected in the second mode after the image is rotated 180° (i.e., flip the image collected in the second mode up and down).

In some embodiments, for different modes, the direction of the image collected by the optical acquisition assembly can be adjusted. Thus, the image collected in the first mode can be directly used, and the image collected in the second mode can be used after being flipped up and down. Thus, the optical acquisition assembly can be used in the plurality of scenes. After the direction of the image is adjusted, the image can be displayed in a positive direction to facilitate subsequent processing of the image.

In some embodiments, the optical acquisition assembly can include the toggle switch. When the toggle switch is at different positions, corresponding function modes can be different. The user can switch the toggle switch to trigger the function mode corresponding to the position of the toggle switch. The toggle switch can include position 0 and position 1. Position 0 can correspond to the first mode. Position 1 can correspond to the second mode. The user can switch the toggle switch from position 0 to position 1 to trigger the function mode to be switched from the first mode to the second mode. The response assembly can be configured to rotate the collected image 180° at the horizontal reference and the perpendicular reference. The user can switch the toggle switch from position 1 to position 0 to trigger the function mode to be switched from the second mode to the first mode. The response assembly can rotate the collected image 180° at the horizontal reference and the perpendicular reference.

Figure 12:
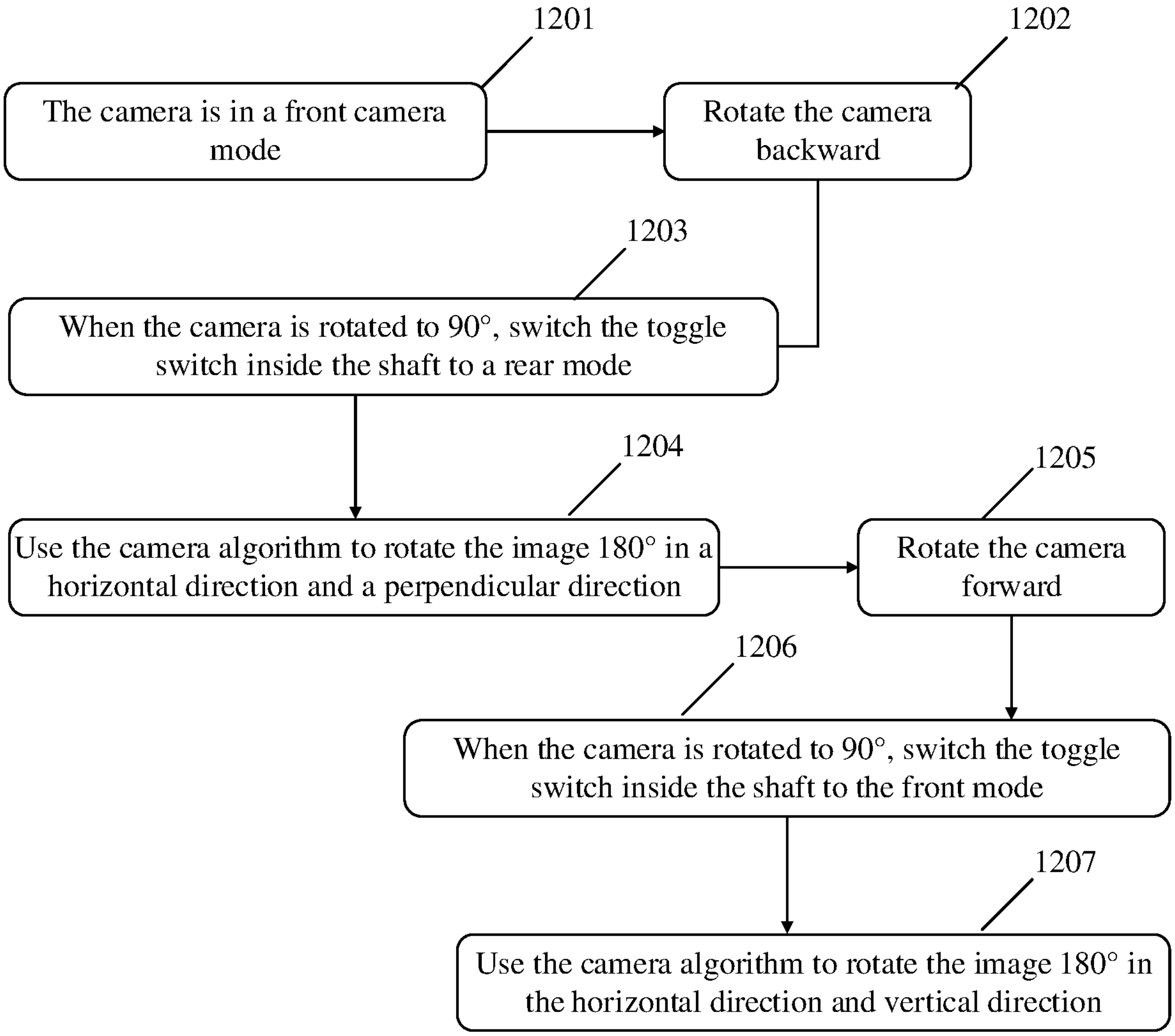
FIG. 12 illustrates a schematic structural diagram showing an operation principle of a camera according to some embodiments of the present disclosure.

In some embodiments, as shown in FIG. 12, the operation principle of the camera includes the following processes.

At 1201, the camera is in a front camera mode.

At 1202, the camera is rotated backward.

At 1203, When the camera is rotated to 90°, the toggle switch inside the shaft is switched to a rear mode.

At 1204, the camera algorithm is used to rotate the image 180° in a horizontal direction and a perpendicular direction.

At 1205, the camera is rotated forward.

At 1206, when the camera is rotated to 90°, the toggle switch inside the shaft is switched to the front mode.

At 1207, the camera algorithm is used to rotate the image 180° in the horizontal direction and vertical direction.

In some embodiments, the camera can be easily switched between front shooting and rear shooting. The toggle switch inside the shaft can be configured to adjust the image.

In some embodiments, the first functional assembly can be the optical output assembly. The function mode can include at least two of the third mode, fourth mode, and fifth mode.

The first detection assembly can be configured to perform at least two of determining that the output orientation of the optical output assembly in the third mode is the first direction, determining that the output orientation of the optical output assembly in the fourth mode is the second direction, and determining the output orientation of the optical output assembly in the fifth mode is the third direction. The first direction can be opposite to the second direction. The response assembly can be configured to respond to the output orientation to adjust the color and/or brightness of the optical output assembly.

In the third mode, the output orientation of the optical output assembly can be the same as the acquisition orientation of the optical assembly. Thus, the optical output assembly can supplement light for a collected object of the optical assembly to improve the collection experience of the user. In the fourth mode, the output orientation of the optical output assembly can face the direction of the input assembly of the electronic device. Then, the optical output assembly can illuminate the input assembly to improve the input experience of the user. In the fifth mode, the output orientation of the optical output assembly can be opposite to the acquisition orientation of the optical assembly. Then, the optical output assembly can supplement light for the environment to prevent the display assembly from being too bright for the user to improve the viewing experience of the user.

The response assembly can be a chip of the accessory device, such as a System on Chip (SoC) or a Microcontroller Unit (MCU). Adjusting the functional parameter of the optical output assembly can include adjusting the color and/or brightness of the output light of the optical output assembly. For different output orientations, the color and/or brightness of the corresponding output light can be the same or different. Under a certain output orientation, the response assembly can switch between the colors and/or brightness of the plurality of types of output light. The color and/or brightness of the output light of the optical output assembly can be adjusted through a light source adjustment touch button. The output light can include warm light, cold light, warm white light, etc.

In the third mode, the output light of the optical output assembly can be bright cold light to make the image of the collected object clearer. In the fourth mode, the output light of the optical output assembly can be dim warm light to save energy while providing softer illumination for the input assembly. In the fifth mode, the output light of the optical output assembly can be dim warm white light to save energy while providing soft ambient light for the display assembly.

The third mode, fourth mode, and fifth mode may not be necessary. The optical output assembly can include any two of the third mode, fourth mode, and fifth mode.

In some embodiments, the color and/or brightness of the output light of the optical output assembly can be adjusted for different modes. Thus, the optical output assembly can be applied in the plurality of scenes. The color and/or brightness of the output light corresponding to different modes can better satisfy the user needs.

In some embodiments, the optical output assembly can further include the light source adjustment touch button. The user can click on the light source adjustment touch button to switch the color and/or brightness of the output light. For example, in the third mode, the output light can be switched to the bright warm white light to further improve the illumination function for the input assembly of the electronic device, which further improves the input experience of the user. In the fifth mode, the output light can be switched to the bright cold light to further improve the viewing experience of the user.

In some embodiments of the present disclosure, a surface light can be easily switched between supplement light to the keyboard and screen and can provide at least three types of light sources, i.e., warm light, cold light, and warm white light. The user can adjust the color temperature of the light by clicking the light source adjustment touch button at the light assembly.

Figure 4:
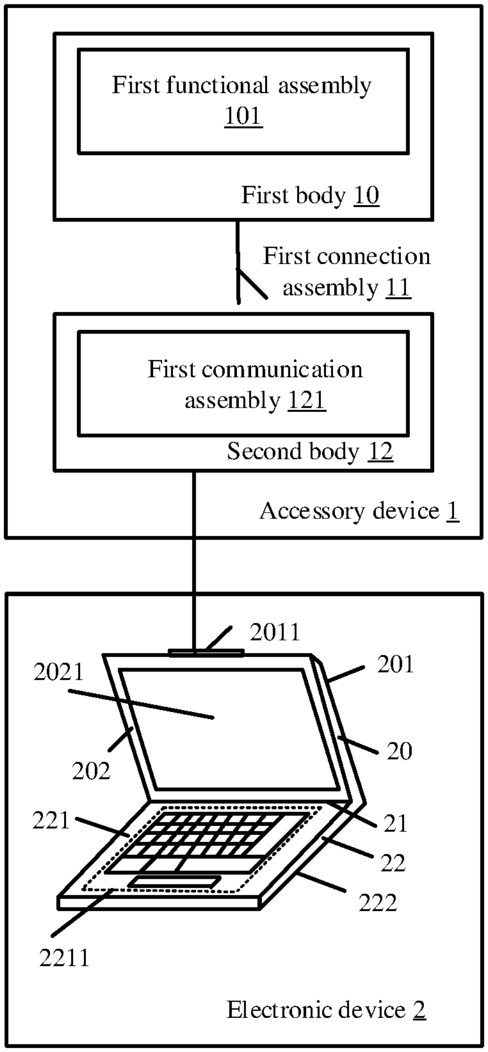
FIG. 4 illustrates a schematic structural diagram of an electronic system according to some embodiments of the present disclosure.

FIG. 4 illustrates a schematic structural diagram of an electronic system according to some embodiments of the present disclosure. As shown in FIG. 4, the electronic system includes an accessory device 1, including a first body 10, a first connection assembly 11, and a second body.

The first body 10 includes a first functional assembly 101.

The first connection assembly 11 is connected to the first body 10.

The second body 12 is connected to the first connection assembly 11 and includes a first communication assembly 121. The first communication assembly 121 is configured to be electrically connected to an electronic device 2.

The first functional assembly 101 can have a functional orientation. The first body 10 can change the position relationship with the second body 12 through the first connection assembly 11 to change the functional orientation of the first functional assembly, thereby 101.

The accessory device can be applied cooperatively with the electronic device. The first communication assembly can realize the data transmission between the accessory device and the electronic device or cause the electronic device to provide power to the accessory device. When the orientation of the first functional assembly faces different directions, different functions can be effective.

The electronic device 2 includes a third body 20, a third connection assembly 21, and a fourth body 22.

The third body 20 can be plate-shaped and include a first side surface 201 and a second side surface 202 opposite to each other. The second side surface 202 can include a display assembly 2021 having a display function. The display assembly can be a touch screen with a display function and an input function.

The third connection assembly 21 can be connected to the third body 20.

The fourth body 22 can be connected to the third connection assembly 21 and include a third side surface 221 and a fourth side surface 222 that are opposite to each other. The third side surface 221 can include an input assembly 221 with an input function. The input assembly can include a touch screen with the display function and the input function. The input assembly can include a physical keyboard and a touchpad.

The first side surface 201 can include a second communication assembly 2011 configured to be electrically connected to the first communication assembly 121.

The electronic device can be a laptop, a mobile phone, a tablet, etc. When the electronic device is a laptop, the display assembly can be a display screen. The input assembly can be a keyboard. The first side surface can be surface A of the laptop, i.e., a top cover of the laptop. The second side surface can be surface B of the laptop, i.e., the surface where the display screen of the laptop is. The third side surface can be surface C of the laptop, i.e., the surface where the keyboard is. The fourth side surface can be surface D of the laptop, i.e., the bottom surface of the laptop. The third connection assembly can be the hinge of the laptop.

The display assembly of the electronic device can be a display screen, which can be a touchscreen. The display screen can be a flexible or non-flexible screen, and a single screen or a dual screen. The input assembly can be a control member at the display screen. When the display screen is the dual screen, the second side surface can be a surface where a small screen is located, and the first side surface can be a surface facing away from the small screen. The third side surface can be a surface where the other small screen is located. The fourth side surface can be a surface facing away from the other small screen. The third connection assembly can be a hinge connecting the two screens of the dual screens of the display screen.

In some embodiments, the first communication assembly can be a male end of a pogo pin connector (i.e., a pogo pin male end), and the second communication assembly can be a female end of the pogo pin (i.e., a pogo pin female end). The pogo pin male end can be electrically connected to the pogo pin female end. In some other embodiments, the first communication assembly and the second communication assembly can also be USB ports. One of the first communication assembly and the second communication assembly can be a USB male end, and the other one of the first communication assembly and the second communication assembly can be a USB female end. The USB male end can be electrically connected to the USB female end to realize the data transmission between the accessory device and the electronic device or allow the electronic device to provide power to the accessory device.

In some embodiments of the present disclosure, by changing the position relationship between the first body and the second body, the functional orientation of the first functional assembly can be changed to allow the first functional assembly to have different functions. The first functional assembly may not be limited to a fixed scene for use and can be applied in a plurality of scenes by changing the orientation, which improves the varsity of the application of the first functional assembly. The accessory device and the electronic device can be electrically connected through the first communication assembly and the second communication assembly to realize the data transmission between the accessory device and the electronic device or allow the electronic device to provide power to the accessory device.

Figure 5:
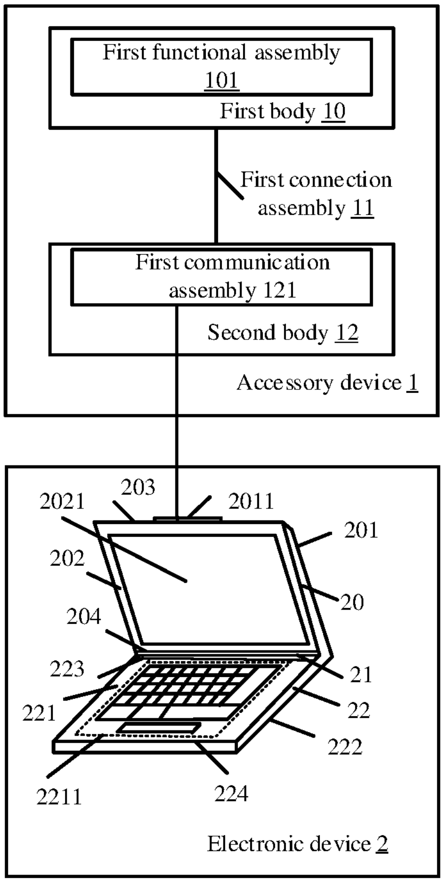
FIG. 5 illustrates a schematic structural diagram of another electronic system according to some embodiments of the present disclosure.

In some embodiments, as shown in FIG. 5, a third body 20 includes a first end 203 and a second end 204 that are opposite to each other. The second end 204 is connected to the third connection assembly 21. The fourth body 22 includes a third end 223 and a fourth end 224 that are opposite to each other. The third end 223 is connected to the third connection assembly 21. The third body 20 and the fourth body 22 can rotate relative to each other through the third connection assembly 21. A second communication assembly 2011 is arranged at the first end 203.

The first end can be an end of the third body away from the third connection assembly of the electronic device. The second end can be an end of the third body connected to the third connection assembly of the electronic device. Similarly, the third end can be an end of the third body connected to the third connection assembly of the electronic device. The fourth end can be an end of the third body away from the third connection assembly of the electronic device. The accessory device can be electrically connected to the second communication assembly at the first end through the first communication assembly.

Taking a laptop as an example, the first end can be an end of surface A and surface B of the laptop away from the hinge of the laptop. The second end can be an end of surface A and surface B connected to the hinge of the laptop. The third end can be an end of surface C and surface D of the laptop connected to the hinge of the laptop. The fourth end can be an end of surface C and surface D away from the hinge of the laptop. The pogo pin female end can be arranged at the first end of surface A of the laptop and can be electrically connected to the pogo pin male end of the accessory device to provide power and transmit a signal.

In some embodiments, when the accessory device is an optical acquisition assembly, by arranging the second communication assembly at the first end of the electronic device, the optical acquisition assembly can be electrically connected to the second communication assembly of the first end through the first communication assembly to maintain the optical acquisition assembly at the first end. Thus, the optical acquisition assembly can better collect images in a plurality of different scenes, such as facial images of the user, scenery images, etc.

In some embodiments, when the accessory device is an optical output assembly, by arranging the second communication assembly at the first end of the electronic device, the optical output assembly can be electrically connected to the second communication assembly at the first end through the first communication assembly to maintain the optical output assembly at the first end. Thus, the optical output assembly can better output light of different colors and/or brightness in the plurality of scenes, such as facial supplemental light, supplemental light for the input device or display device of the electronic device, environment supplemental light, etc.

Figure 6:
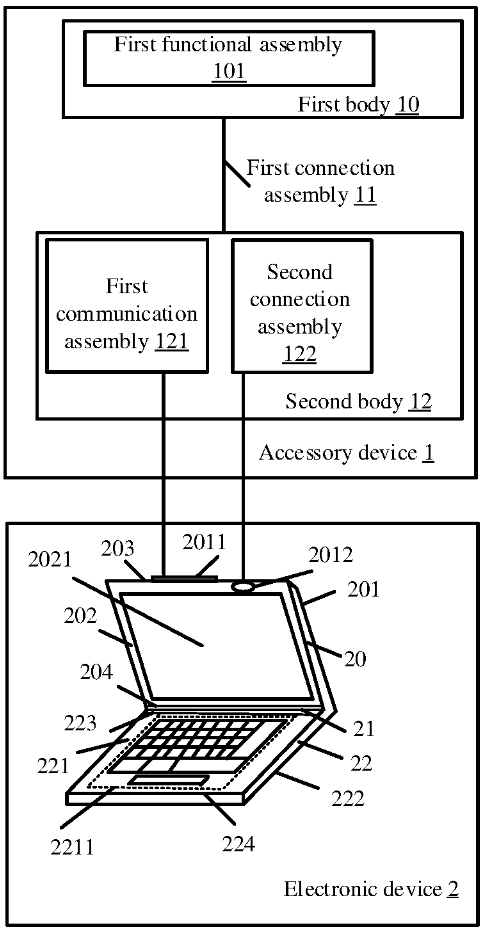
FIG. 6 illustrates a schematic structural diagram of another electronic system according to some embodiments of the present disclosure.

In some embodiments, as shown in FIG. 6, a second body 12 includes a second connection assembly 122. A fourth connection assembly 2012 is arranged at the first end 203 of the third body 20. The second connection assembly 122 can be detachably connected to the fourth connection assembly 2012.

After the second connection assembly 122 is connected to the fourth connection assembly 2012, the position relationship between the accessory device 1 and the electronic device 2 can be maintained, and the first communication assembly 121 and the second communication assembly 2011 are electrically connected.

In some embodiments, the second connection assembly and the fourth connection assembly can be two magnet connectors. The second connection assembly and the fourth connection assembly can be magnetically attached to each other to maintain the position relationship between the accessory device and the electronic device. The second connection assembly and the fourth connection assembly can also be elastic connectors, bolt connectors, etc. The second connection assembly and the fourth connection assembly can be connected by elastic connectors or bolt connectors to maintain the position relationship between the accessory device and the electronic device.

In some embodiments, the first communication assembly and the second communication assembly can also be USB ports. One of the first communication assembly and the second communication assembly can be a USB male end, and the other one of the first communication assembly and the second communication assembly can be a USB female end. The USB male end and USB female end can be electrically connected to provide power and transmit a signal.

In some other embodiments, the first communication assembly can be a pogo pin female end, and the second communication assembly can be a pogo pin male end. The pogo pin female end can be arranged at the first end of the surface A of the laptop and can be electrically connected to the pogo pin male end of the accessory device for power supply and signal transmission. If the laptop does not have a pogo pin, a pogo pin to USB adapter can be provided with the USB port of the laptop to directly connect the converted pogo pin to the pogo pin of the accessory device.

In some embodiments of the present disclosure, the accessory device and the electronic device can be detachably connected through the second connection assembly. The second connection assembly can be configured to maintain the position relationship between the accessory device and the electronic device. Thus, the accessory device and the electronic device can be flexibly connected, and the position relationship between the accessory device and the electronic device can be maintained to improve the independence and stability of the accessory device.

Figure 7:
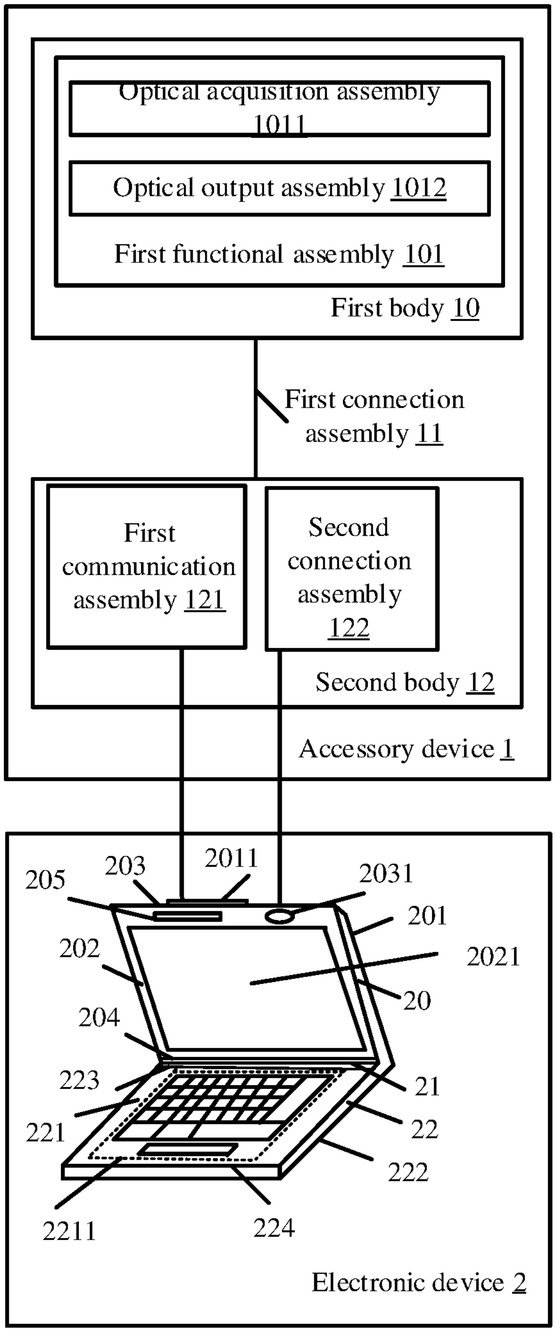
FIG. 7 illustrates a schematic structural diagram of another electronic system according to some embodiments of the present disclosure.

In some embodiments, as shown in FIG. 7, a first connection assembly 11 is a rotatable connection assembly. The first functional assembly 101 is an optical functional assembly, including at least one of an optical acquisition assembly 1011 with an acquisition orientation or an optical output assembly 1012 with an output orientation.

In some embodiments, as shown in FIG. 7, the first functional assembly 101 includes the optical acquisition assembly 1011. An angle between the third body 20 and the fourth body 22 can be between 90° and 180°. After the accessory device 1 is connected to the electronic device 2, the first body 10 and the second body 12 can rotate to allow the acquisition orientation to be switched between the first direction and the second direction. The first direction is a direction faced by the first side surface 201, and the second direction is a direction faced by the second side surface 202.

Figure 8A:
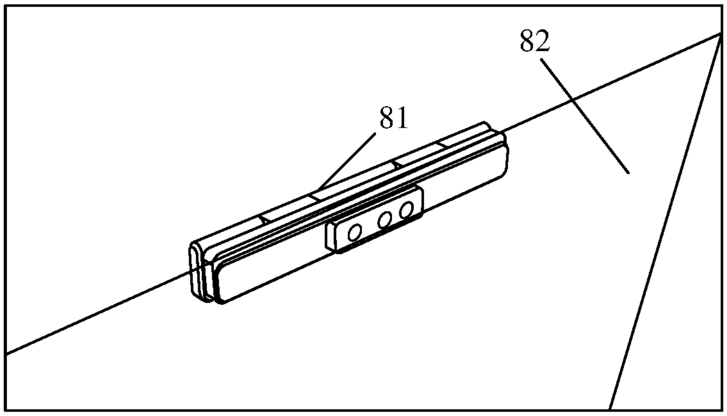
FIG. 8A illustrates a schematic diagram showing an orientation of an optical acquisition assembly according to some embodiments of the present disclosure.
Figure 8B:
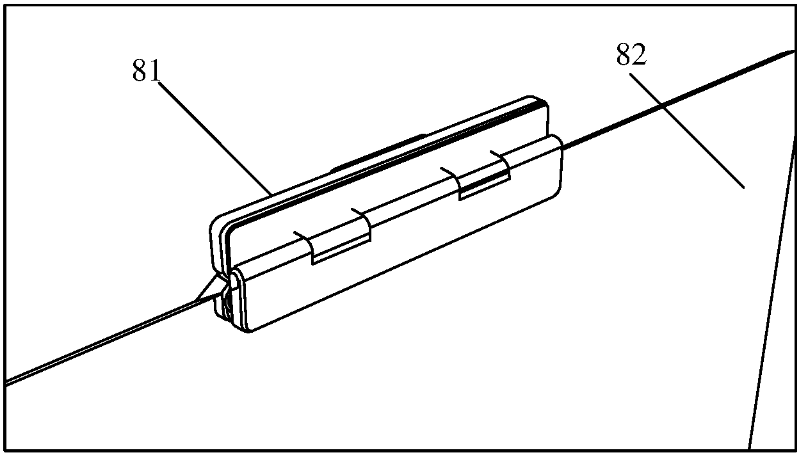
FIG. 8B illustrates a schematic diagram showing another orientation of an optical acquisition assembly according to some embodiments of the present disclosure.
Figure 8C:
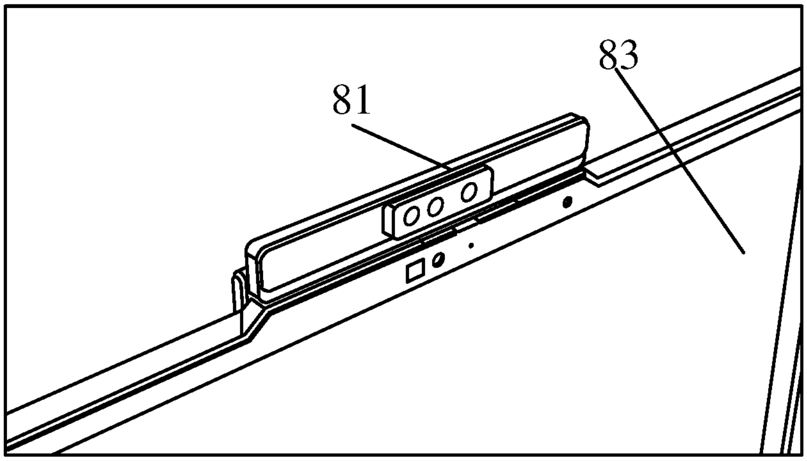
FIG. 8C illustrates a schematic diagram showing another orientation of an optical acquisition assembly according to some embodiments of the present disclosure.

When the electronic device is a laptop, and the accessory device is a camera, as shown in FIG. 8A, a camera 81 is flipped backward to face the direction faced by surface A 82 of the laptop. The first direction faced by the camera 81 can be the direction faced by surface A 82 of the laptop, and the camera is in a rear-shooting mode. As shown in FIG. 8B and FIG. 8C, the camera 81 is upright. The second direction faced by the camera 81 can be a direction faced by surface B 83 of the laptop, and the camera is in a front-shooting mode. The camera 81 can also be rotated to a direction between the first direction and the second direction to collect images from more angles.

In embodiments of the present disclosure, the optical acquisition assembly can face different directions to correspond to different function modes to collect images from more angles.

In some embodiments, as shown in FIG. 7, the first functional assembly 101 includes the optical output assembly 1012. The angle between the third body 20 and the fourth body 22 is between 90° and 180°. After the accessory device 1 is connected to the electronic device 2, the first body 10 and the second body 12 can rotate to allow the acquisition orientation to switch between the first direction, the second direction, and the third direction. The first direction is a direction faced by the first side surface 201, the second direction is a direction faced by the second side surface 202, and the third direction is a direction faced by the third side surface 221.

Figure 9A:
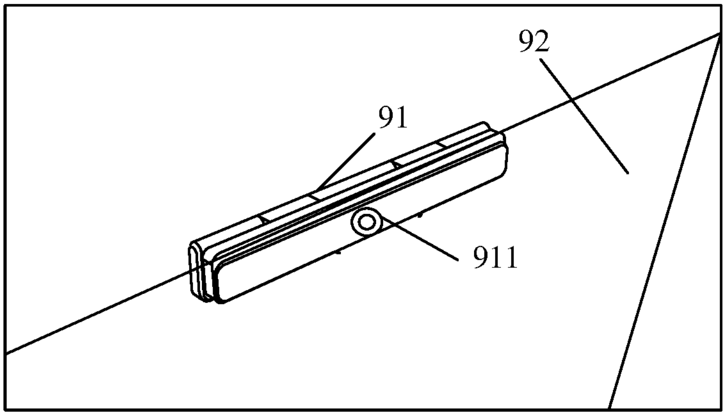
FIG. 9A illustrates a schematic diagram showing an orientation of an optical output assembly according to some embodiments of the present disclosure.
Figure 9B:
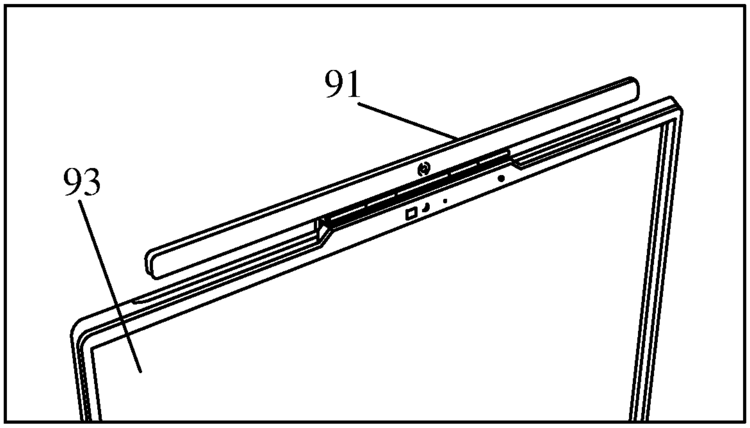
FIG. 9B illustrates a schematic diagram showing an orientation of another optical output assembly according to some embodiments of the present disclosure.
Figure 9C:
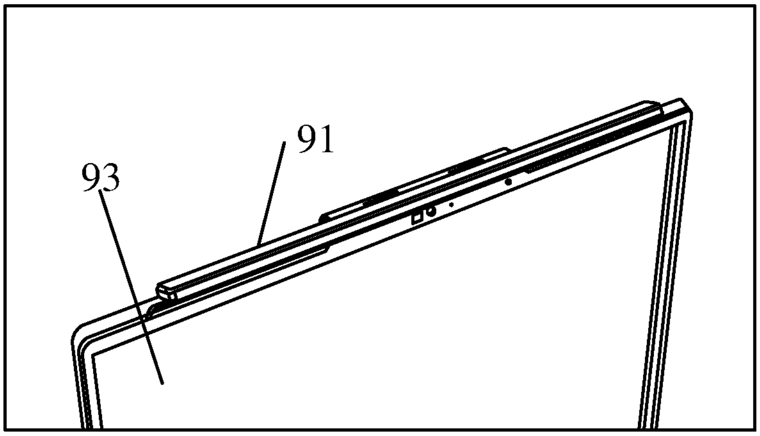
FIG. 9C illustrates a schematic diagram showing an orientation of another optical output assembly according to some embodiments of the present disclosure.

When the electronic device is a laptop, and the accessory device is a lighting assembly, as shown in FIG. 9A, the first direction faced by the lighting assembly 91 is the direction faced by surface A 92 of the laptop. The first direction is opposite surface B where the display assembly of the laptop is located. The lighting assembly 91 can be configured to improve the operation environment of the display assembly to prevent the display assembly from being too bright to further improve the viewing experience of the user. The lighting assembly includes a light source adjustment touch button 911 configured to adjust the color and/or brightness of the output light of the lighting assembly. As shown in FIG. 9B, the second direction faced by the lighting assembly 91 can be the direction faced by surface B of the laptop. When the orientations of the camera and the lighting assembly 91 are the same, the lighting assembly 91 can be used as a face light to illuminate the user face to supplement light for the user. As shown in FIG. 9C, the lighting assembly 91 is flipped downward. The third direction faced by the lighting assembly 91 can face surface C of the laptop. The lighting assembly 91 can illuminate the input assembly to improve the operation environment of the input assembly and improve the input experience of the user. The lighting assembly 91 can be further rotated to face a direction between the first direction and the third direction to illuminate or supplement light from more angles.

In some embodiments of the present disclosure, the optical output assembly can have different orientations to correspond to different function modes to illuminate or supplement light from more angles.

In some embodiments, as shown in FIG. 7, the electronic device 2 includes a second detection assembly 205 configured to determine the connected accessory device 1.

The second detection assembly can be configured to detect whether the accessory device is connected to the electronic device. When the accessory device and the electronic device are connected, the second detection assembly can determine the type and manufacturer of the accessory device according to the identification information of the accessory device. The identification information can be an identity document (ID).

In some embodiments, the second detection assembly can be configured to detect whether the accessory device is connected to the electronic device to avoid short circuits and also determine the type and manufacturer of the connected accessory device. Thus, after the accessory device is authenticated through the identification information, the electronic device can be connected to the accessory device to improve connection safety.

Figure 10:
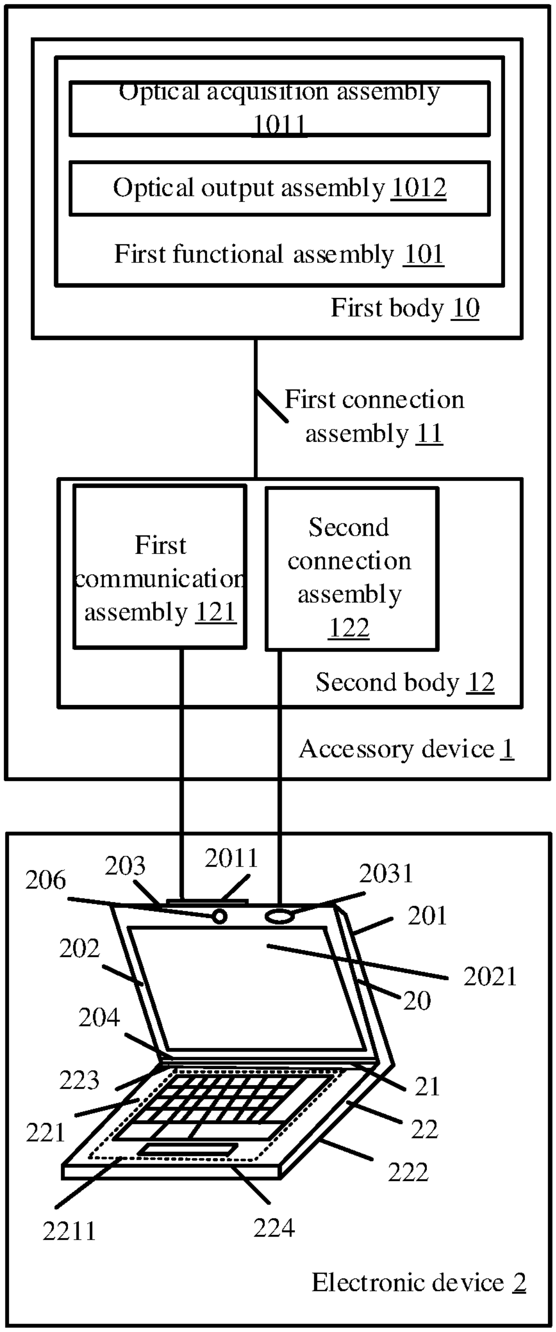
FIG. 10 illustrates a schematic structural diagram of another electronic system according to some embodiments of the present disclosure.

In some embodiments, as shown in FIG. 10, the electronic device includes a second functional assembly 206. The performance parameter of the first functional assembly is better than the performance parameter of the second functional assembly.

The second functional assembly can be a camera, a lighting assembly, etc. That is, the camera or the lighting assembly of the electronic device. The performance parameter of the first functional assembly of the accessory device can be better than the performance parameter of the second functional assembly of the electronic device. For example, the pixels of the camera of the accessory device can be higher than the pixels of the camera of the electronic device, and the brightness of the lighting assembly of the accessory device can be higher than the brightness of the lighting assembly of the electronic device.

In some embodiments, since the performance of the first functional assembly is better than the performance of the second functional assembly, the accessory device with the first functional assembly can be connected to the electronic device to assist the electronic device to achieve better performance and improve the user experience.

In some embodiments, as shown in FIG. 10, the electronic device includes a second functional assembly 206. The first functional assembly can be configured to improve the operation environment of the second functional assembly.

The second functional assembly can be an input assembly (such as a keyboard), a display assembly (such as a screen), etc., and the first functional assembly can be a lighting assembly. When the lighting assembly faces the input assembly of the electronic device, the lighting assembly can illuminate the input assembly to improve the operation environment of the input assembly and improve the input experience of the user. When the orientations of the lighting assembly and the display assembly are opposite to each other, the lighting assembly can supplement light to the environment to prevent the display assembly from being too bright for the user to improve the operation environment of the display assembly and improve the viewing experience of the user.

In some embodiments, most cameras and surface lights used by the laptop can be used with fixed angles and can not be flipped. Even the angle can be adjusted, only a small angle can be adjusted by rotating around the center shaft. Thus, the user can only use the cameras and the surface light in the fixed scene and cannot use the cameras and the surface light in a plurality of scenes with format change. For example, the camera can only be used as a front camera and cannot flipped to be used as a rear camera. The surface light can only illuminate the face of the user and cannot be flipped downward to be used as a supplement light for the screen and keyboard.

Figure 11:
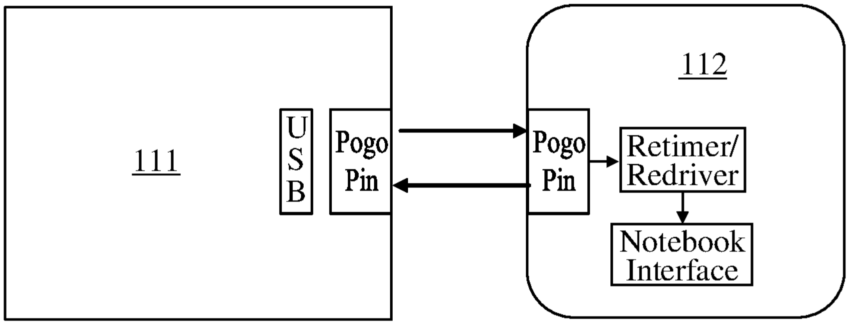
FIG. 11 illustrates a schematic structural diagram of another electronic system according to some embodiments of the present disclosure.

In some embodiments, as shown in FIG. 11, the electronic device includes a detachable camera or another accessory device 111 and a laptop 112. The detachable camera or another device 111 can include a USB interface and a pogo pin male end. The laptop 112 can include a pogo pin female end, a signal enhancement circuit, and a notebook interface. The signal enhancement circuit can include a signal amplifier Redriver and a signal restorer Retimer. Redriver can be configured to amplify a signal, and Retimer can be configured to reconstruct a signal using an internal clock (i.e., restore signal Rx to a digital signal first, and then convert the digital signal into an analog signal) to increase the signal transmission energy before sending the signal out. The Notebook Interface can be a USB3.0 version, supporting accessory devices of USB2.0 or USB3.0 versions. A power specification of the accessory device can be 5 volts (V) and 2 amps (A), and the pogo pin male and female ends can each have 10 pins.

In some documents, the terms "comprise," "include," or any other variations are intended to cover non-exclusive inclusion, such that a process, method, item, or device including a series of elements includes not only those elements explicitly listed but also other elements not explicitly listed, or elements inherent to the process, method, item, or device. When there are no more limitations, an element defined by the phrase "including one . . . " does not exclude other identical elements included in the process, method, item, or device including the element.

In some embodiments of the present disclosure, the disclosed devices and methods can be implemented in other methods. The device embodiments described above are illustrative. For example, the division of units is merely a logical functional division. In some embodiments, alternative divisions are possible. For example, a plurality of units or assemblies can be combined or integrated into another system, or some features can be ignored or not executed. Additionally, the coupling, direct coupling, or communication connections between the displayed or discussed components can be indirect coupling or communicative connection through some interfaces, devices, or units, which can be electrical, mechanical, or another form.

The units described as separate components can be or not be physically separated. The components displayed as units may or may not be physical units and can be located in one place or distributed to a plurality of network units. Some or all of the units can be selected to implement the solution of the present disclosure. In addition, the functional units of embodiments of the present disclosure can be integrated into one processing unit or can be each used as a separate unit, or two or more units can be integrated into a unit. The integrated unit can be implemented in hardware, or in the form of a hardware and software functional unit.

Those skilled in the art can understand that all or some steps of method embodiments can be implemented by instructing relevant hardware through a program. The program can be stored in a computer-readable storage medium. When the program is executed, the steps of the method embodiments can be performed. The storage medium can include a medium storing program codes such as a mobile storage device, a read-only memory (ROM), disks, or optical discs. In some other embodiments, when the integrated units are implemented by a software functional module and sold or applied as an independent product, the units can also be stored in a computer-readable storage medium. Thus, the essence of the technical solution of the embodiments of the present disclosure, or the portion that makes a contribution to the relevant technology can be embodied in the form of a software product. The software product can be stored in a storage medium, including several instructions used to cause a computer device (such as a mobile phone, tablet, desktop computer, personal digital assistant, navigation device, digital phone, video phone, television, sensor device, etc.) to execute all or a part of the methods of embodiments of the present disclosure. The storage medium can include a storage medium storing program codes, such as a mobile storage device, ROM, disks, or optical discs, among various media capable of storing program code.

The methods of embodiments of the present disclosure can be arbitrarily combined to obtain new method embodiments. Features of product embodiments of the present disclosure can be arbitrarily combined when there is no conflict to obtain new product embodiments. Features of method or device embodiments of the present disclosure can be arbitrarily combined when there is no conflict to obtain new method or device embodiments.

The above description is embodiments of the present disclosure. However, the scope of the present disclosure is not limited to this. Those skilled in the art can easily think of modifications or replacements. These modifications or replacements are within the scope of the present disclosure. Therefore, the scope of the present disclosure should be subject to the scope of the claims.

What is claimed is:

1. An accessory device comprising:
- a first body including a first functional assembly, the first functional assembly including an optical output assembly;
- a first connection assembly connected to the first body;
- a second body connected to the first connection assembly and including a first communication assembly configured to be electrically connected to an electronic device;
- a first detection assembly configured to detect a functional orientation of the first functional assembly and determine a function mode of the first functional assembly based on the functional orientation; and
- a response assembly;
- wherein:
  - a position relationship between the first body and the second body is changed according to the first connection assembly to change the functional orientation of the first functional assembly;
  - the function mode includes at least two of a first mode, a second mode, and a third mode;
  - the first detection assembly is configured to perform at least two of:
    - determining that an output orientation of the optical output assembly in the first mode is in a first direction;
    - determining that the output orientation of the optical output assembly in the second mode is in a second direction; and
    - determining that the output orientation of the optical output assembly in the third mode is in a third direction;
  - the first direction and the second direction are opposite to each other; and
  - the response assembly is configured to respond to the output orientation to adjust a color and/or brightness of the optical output assembly.

2. The accessory device according to claim 1, wherein:
- the first connection assembly is a rotatable connection assembly.

3. The accessory device according to claim 1, wherein:
- the second body includes a second connection assembly detachably connected to the electronic device; and
- after the second connection assembly is connected to the electronic device, a position relationship between the accessory device and the electronic device is maintained, and the first communication assembly is electrically connected to the electronic device.

4. The accessory device according to claim 1, wherein the first detection assembly is further configured to:
- obtain a first trigger operation and determine the function mode of the first functional assembly based on the first trigger operation.

5. The accessory device according to claim 1, wherein:
- the first functional assembly further includes an optical acquisition assembly;
- the function mode further includes a fourth mode and a fifth mode;
- the first detection assembly is further configured to determine that an acquisition orientation of the optical acquisition assembly is a fourth direction in the fourth mode, and the acquisition orientation is a fifth direction in the fifth mode; and
- the response assembly is further configured to collect an image in the fourth mode with a sixth direction as a positive direction and an image in the fifth mode with a seventh direction as the positive direction.

6. An electronic system comprising:
- an accessory device, including:
  - a first body including a first functional assembly, the first functional assembly including an optical output assembly;
  - a first connection assembly connected to the first body;
  - a second body connected to the first connection assembly and including a first communication assembly configured to be electrically connected to an electronic device;
  - a first detection assembly configured to detect a functional orientation of the first functional assembly and determine a function mode of the first functional assembly based on the functional orientation; and
  - a response assembly;
  - wherein:

a position relationship between the first body and the second body is changed according to the first connection assembly to change the functional orientation of the first functional assembly;

the function mode includes at least two of a first mode, a second mode, and a third mode;

the first detection assembly is configured to perform at least two of:

determining that an output orientation of the optical output assembly in the first mode is in a first direction;

determining that the output orientation of the optical output assembly in the second mode is in a second direction; and determining that the output orientation of the optical output assembly in the third mode is in a third direction;

the first direction and the second direction are opposite to each other; and the response assembly is configured to respond to the output orientation to adjust a color and/or brightness of the optical output assembly; and an electronic device including:

a third body in a plate shape including a first side surface and a second side surface, a display assembly having a display function being arranged on the second side surface;

a third connection assembly connected to the third body;

a fourth body connected to the third connection assembly and including a third side surface and a fourth side surface that are opposite to each other, an input assembly having an input function being arranged at the third side surface;

wherein a second communication assembly is arranged at the first side surface and configured to be electrically connected to the first communication assembly.

7. The system according to claim 6, wherein:

the first connection assembly is a rotatable connection assembly.

8. The system according to claim 6, wherein:

the second body includes a second connection assembly detachably connected to the electronic device; and after the second connection assembly is connected to the electronic device, a position relationship between the accessory device and the electronic device is maintained, and the first communication assembly is electrically connected to the electronic device.

9. The system according to claim 6, wherein the first detection assembly is further configured to:

obtain a first trigger operation and determine the function mode of the first functional assembly based on the first trigger operation.

10. The system according to claim 6, wherein:

the first functional assembly further includes an optical acquisition assembly;

the function mode further includes a fourth mode and a fifth mode;

the first detection assembly is further configured to determine that an acquisition orientation of the optical acquisition assembly is a fourth direction in the fourth mode, and the acquisition orientation is a fifth direction in the fifth mode; and the response assembly is further configured to collect an image in the fourth mode with a sixth direction as a positive direction and an image in the fifth mode with a seventh direction as the positive direction.

11. The system according to claim 6, wherein:

the third body includes a first end and a second end opposite to each other, the second end being connected to the third connection assembly;

the fourth body includes a third end and a fourth end opposite to each other, the third end being connected to the third connection assembly;

the third body and the fourth body rotate relative to each other through the third connection assembly; and the second communication assembly is arranged at the first end.

12. The system according to claim 6, wherein:

the first functional assembly further includes an optical acquisition assembly;

an angle between the third body and the fourth body is between 90° and 180°;

after the accessory device is connected to the electronic device, the first body and the second body rotate to cause an acquisition orientation of the optical acquisition assembly to be switched between a fourth direction and a fifth direction; and the fourth direction is a direction faced by the first side surface, and the fifth direction is a direction facing by the second side surface.

13. The system according to claim 6, wherein:

an angle between the third body and the fourth body is between 90° and 180°;

after the accessory device is connected to the electronic device, the first body and the second body rotate to cause the output orientation to be switched among the first direction, the second direction, and the third direction; and the first direction is a direction faced by the first side surface, the second direction is a direction faced by the second side surface, and a third direction is a direction faced by a third side surface.

14. The system according to claim 6, wherein:

the electronic device includes a second functional assembly; and a performance parameter of the first functional assembly is better than a performance parameter of the second functional assembly, or the first functional assembly is configured to improve an operation environment of the second functional assembly.

* * * * *